(12) United States Patent
Disch et al.

(10) Patent No.: US 7,645,821 B2
(45) Date of Patent: Jan. 12, 2010

(54) LOW-EMISSION, TRIBOLOGICALLY MODIFIED POLYOXYMETHYLENE MOLDING COMPOSITIONS AND MOLDINGS PRODUCED THEREFROM

(75) Inventors: Stefan Disch, Konigsstein (DE); Kurt Witan, Hofheim (DE); Klaus Kurz, Kelsterbach (DE)

(73) Assignee: Ticona GmbH, Kelsterbach (DE)

( * ) Notice: Subject to any disclaimer, the term of this patent is extended or adjusted under 35 U.S.C. 154(b) by 255 days.

(21) Appl. No.: 11/493,752

(22) Filed: Jul. 26, 2006

(65) Prior Publication Data

US 2007/0105989 A1 May 10, 2007

Related U.S. Application Data

(60) Provisional application No. 60/705,040, filed on Aug. 3, 2005.

(30) Foreign Application Priority Data

Jul. 28, 2005 (DE) .................. 10 2005 035 334

(51) Int. Cl.
*C08K 5/34* (2006.01)
*C08K 5/3492* (2006.01)
*C08K 5/04* (2006.01)
*C08K 5/10* (2006.01)
*C08K 5/3432* (2006.01)

(52) U.S. Cl. ............... 524/91; 524/94; 524/99; 524/100; 524/102; 524/291; 524/398; 524/512

(58) Field of Classification Search .............. 524/91, 524/94, 99, 100, 102, 291, 398, 512
See application file for complete search history.

(56) References Cited

U.S. PATENT DOCUMENTS

| 4,556,690 | A | 12/1985 | Nakagawa |
| 5,039,741 | A | 8/1991 | Burg |
| 6,191,222 | B1 * | 2/2001 | Keller et al. ............... 525/154 |
| 6,673,405 | B2 * | 1/2004 | Harashina ................. 428/35.7 |

FOREIGN PATENT DOCUMENTS

| EP | 156285 | 10/1985 |
| EP | 354802 | 2/1990 |
| EP | 420564 | 4/1991 |
| EP | 668317 | 8/1995 |
| WO | WO 0226885 | 4/2002 |

* cited by examiner

*Primary Examiner*—Kriellion A Sanders
(74) *Attorney, Agent, or Firm*—Dority & Manning, P.A.

(57) ABSTRACT

The invention relates to moldings or molding compositions composed of polyoxymethylene and featuring very low formaldehyde emission, comprising from 0.1 to 50.0% by weight of a tribological modifier, from 0.01 to 0.5% by weight of a cyclic stabilizer which contains at least one nitrogen atom in the ring, and from 0.05 to 1% by weight of at least one ester composed of a polyhydric alcohol and of at least one ($C_{10}$-$C_{32}$) fatty acid, and also to their production and use.

11 Claims, No Drawings

LOW-EMISSION, TRIBOLOGICALLY MODIFIED POLYOXYMETHYLENE MOLDING COMPOSITIONS AND MOLDINGS PRODUCED THEREFROM

The present invention relates to tribologically modified polyoxymethylene molding compositions which are suitable for production of moldings or of extrudates. The products produced therewith are particularly stable during processing and feature very low formaldehyde emission, defect-free surfaces, and excellent tribological properties.

Since they were introduced to the market about 40 years ago, (a polyoxymethylenes (POMs) have become established in many applications as extremely useful engineering material. POM is widely used particularly as an engineering material in automobile construction, in the electrical industry, and in medical technology. A certain level of mechanical properties is demanded here from POM molding compositions, examples being stiffness, hardness, and toughness, and this is an essential requirement for the use of these materials for engineering components such as gear wheels, levers, and many others. The values demanded for yield stress here are from 60 to 70 N/mm$^2$, and those for the tensile modulus of elasticity of unmodified copolymers are from 2400 to 3100 N/mm$^2$. Values of from 10 to 30% are demanded for tensile strain at break.

Particularly in applications where plastics are in moving contact with metal or other plastics (tribological applications), e.g. gear wheels or gliding elements in automobile construction, it has proven highly advantageous to use polyoxymethylenes. When compared with other plastics, polyoxy-methylenes feature very low wear, a low coefficient of friction and very little generation of frictional noise. The reason for this is the specific structural features of polyoxymethylene, in particular its linear polymer chains with high crystallinity. Even unmodified polyoxymethylene grades exhibit these advantages over other plastics.

Modified polyoxymethylenes comprising tribological additives which, for example, alter the coefficient of friction or reduce noise generation to a very particularly low level now have a long history of use in engineering systems which are subject to movement and to particularly stringent requirements. A significant factor here is that the modifiers weaken the highly polar properties of polyoxymethylene. Many non-polar polymers are used for these purposes, examples being polytetrafluoroethylene, polyethylene, or ultrahigh-molecular-weight polyethylene. Grafted polymers, too, are used, containing not only non-polar but also polar polymer segments. EP-A0354802 and EP-A0420564, by way of example, add a styrene-acrylonitrile copolymer grafted onto polyethylene, erg. LDPE-SAN, to a polyoxymethylene, and describe the tribological properties. U.S. Pat. No. 4,556,690 describes a tribologically modified polyacetal molding composition which comprises, as additive, a polymer which is a grafted copolymer of an alpha-olefin polymer with an unsaturated carboxylic acid or derivatives thereof.

However, a disadvantage here is that the addition of these foreign substances has a major effect on polyoxymethylenes (e.g. Damm, W. and Herrmann, E., in Gächter, Müller; Plastic Additives, 3rd edition, 1989, p. 730). Addition of tribologically active additives can also cause degradation of the material during processing with subsequent liberation of formaldehyde, and this greatly impairs the usefulness of the material for production of moldings. Contaminants in tribological additives, e.g. residual monomers or solvents, are liberated during processing of tribologically modified polyoxymethylene molding compositions and during the use of the moldings produced therefrom. Emission of formaldehyde and contaminants of the tribologically modified additives leads to unpleasant odor, impairing the usefulness of these materials In many application sectors. The automobile industry, which is one of the most important markets for products composed of POM, has specific analysis methods for determining formaldehyde emission from POM moldings (VDA Empfehlung [Recommendation] No. 275, Dokumentation Kraftfahrwesen e.V. July 1994).

Furthermore, in recent years there has been a continuous tightening of the requirements placed upon tribologically modified polyoxymethylene molding compositions in relation to processibility. Firstly, hot-runner technology is increasingly used with injection molds for production of moldings composed of polyoxymethylene for use in the automobile, electrical, and medical technology sector. Secondly, the injection molds, and also the mold geometries, are becoming increasingly complex. The consequence of these developments is that tribologically modified polyacetal molding compositions are exposed to relatively high temperatures during processing, and in the case of tribologically modified polyacetal molding compositions commercially available hitherto this also leads to an increased level of degradation processes, to high formaldehyde emissions, to defects on the molding surface and to impairment of the tribological property profile.

For avoidance of impairment of product properties and of material properties during the processing of tribologically modified POM molding compositions, a requirement is that degradation of material in these POM molding compositions be suppressed. Stabilizers are used for this purpose. EP-A-0354802 uses, as flow aid, an aliphatic acid, an alcohol, or an aliphatic ester having at least 12 carbon atoms. Stabilizer systems conventional for polyoxymethylenes are otherwise used. EP-A-0156285 mentions as stabilizers for the polyacetal phase, polyamides, amides of polybasic carboxylic acids, amidines, hydrazines, poly(N-vinyllactams), and alkaline earth metal salts of aliphatic, preferably hydroxy-containing, mono- to tribasic carboxylic acids having from 2 to 20 carbon atoms. Although the stabilizers and stabilizer systems described in the document can bring about a certain reduction in formaldehyde emission, they generally cause impairment of the mechanical and tribological property profile of the polyoxymethylene molding.

WO 02/26884 describes a combination composed of a cyclic nitrogen-containing stabilizer and of a salt of a carboxylic acid as stabilizer for polyoxymethylene molding compositions comprising an impact modifier. Oxidation stabilizers and light stabilizers can also be used moreover. The stabilizer systems described are capable of reducing formaldehyde emission from polyoxymethylenes comprising impact modifiers, without any resultant impairment of the mechanical properties of the molding. A further Improvement in reduction of formaldehyde emissions specifically of polyoxymethylenes comprising colorants could be achieved using a three-component stabilizer system composed of a cyclic, nitrogen-containing stabilizer, of an ester composed of a polyhydric alcohol and fatty acids, and of a metal salt of a fatty acid (WO 02/26885).

The object of the present invention is then to provide tribologically modified POM molding compositions in which the formaldehyde emission hitherto observed has been significantly reduced, with retention of the mechanical and tribological property profiles. The moldings produced from said molding compositions are moreover intended to have very little odor.

Surprisingly, it has now been found that the use of a stabilizer system composed of a cyclic, nitrogen-containing stabilizer and of at least one ester composed of a polyhydric alcohol and of at least one ($C_{10}$-$C_{32}$) fatty acid is particularly suitable for achieving a further reduction in formaldehyde emission, without any resultant impairment of the good tribological properties of the modified molding composition. It is moreover possible to add other stabilizers, e.g. antioxidants, and in particular sterically hindered phenol compounds, and metal salts of fatty acids.

The present invention therefore provides a polyoxymethylene molding composition or a polyoxymethylene molding, comprising the following components:

(A) from 0.1 to 50.0% by weight of a tribological modifier,
(B) from 0.01-0.5% by weight of a cyclic stabilizer which contains at least one nitrogen atom in the ring, and
(C) from 0.05 to 1% by weight of at least one ester composed of a polyhydric alcohol and of at least one ($C_{10}$-$C_{32}$) fatty acid.

The molding composition or the molding can moreover comprise other components, e.g.

(D) up to 0.5% by weight, preferably up to 0.2% by weight, of a metal salt of a ($C_{10}$-$C_{32}$) fatty acid,
(E) up to 1% by weight, preferably up to 0.5% by weight, of a metal salt of a ($C_1$-$C_9$) carboxylic acid,
(F) up to 1.0% by weight of an antioxidant, preferably of a sterically hindered phenol compound,
(G) up to 1.0% by weight of at least one other stabilizer, preferably from the group of the benzotriazole derivatives or benzophenone derivatives or aromatic benzoate derivatives,
(H) up to 0.5% by weight of a light stabilizer, preferably of a sterically hindered amine (HALS).

Unless explicitly otherwise stated, the % by weight data are based on the total weight of the molding composition or of the molding.

Surprisingly, it has been found that the inventive constitution of the polyoxymethylene molding composition and of the moldings resulting therefrom brings about exceptionally low formaldehyde emission and good stability, even at high temperatures. It has also been found that moldings produced from the inventive molding compositions have an excellent mechanical and tribological property profile.

The stabilizer systems described are, furthermore, particularly suitable for stabilizing polyoxymethylene molding compositions and, respectively, polyoxymethylene moldings comprising oxidized or oxidizable tribological modifiers. In this respect, it is particularly advantageous to restrict the addition of antioxidants which often impair tribological and mechanical properties, and to replace, or preferably supplement, them via the stabilizer combination mentioned. Another advantage of the stabilizer system used is that the polyoxymethylene molding composition or the resultant molding can be neutral to slightly basic, and likewise assists reduction of formaldehyde emission. In this connection, preferred molding compositions, and respectively, moldings are substantially free from hydroxides, from alkoxides, and from inorganic acids, in particular free from their alkali metal salts or their alkaline earth metal salts. The expression "substantially free" here means the amount is below 0.1% by weight, preferably below 0.01% by weight.

Tribological modifiers (A) which may be mentioned and which can be added to the polyoxymethylene molding composition are in particular from 0.1 to 50.0% by weight of the substances (A1) to (A11). These tribological modifiers (A1) to (A11) can be used individually or as a mixture.

(A1) from 0.1-50.0% by weight, preferably from 1.0-25% by weight, of a polytetrafluoroethylene powder (e.g. Dyneon PA 5961, produced by Dyneon, Germany)
(A2) from 0.1-10.0% by weight, preferably from 0.2-5% by weight, particularly preferably from 0.5-2% by weight, of a molybdenum disulfide ($MoS_2$) powder
(A3) from 0.1-50.0% by weight, preferably from 1.0-25% by weight, of a calcium carbonate (chalk) powder (e.g. SL-101 Ca carbonate, Shiraishi, Japan)
(A4) from 0.1-50% by weight, preferably from 1.0-25.0% by weight, particularly preferably from 2.0-10% by weight of a graft copolymer which has an olefin polymer as graft base and, grafted onto this, at least one vinyl polymer or one ether polymer, and/or a graft copolymer which has an elastomeric core based on polydienes and a hard graft envelope composed of (meth)acrylates and/or of (meth)acrylonitriles.

Graft copolymers of this type are described in EP-A-354,802 and EP-A420,564 or in EP-A-156,285 and EP-A-668,317.

A suitable graft base for the graft copolymers of the first type is in principle provided by any of the olefin polymers or olefin copolymers, e.g. homopolymers, such as polyethylene or polypropylene, or copolymers derived from copolymerizable ethylenically unsaturated monomers, e.g. ethylenepropylene copolymers, ethylene-1-butene copolymers, or copolymers derived from ethylene and glycidyl (meth)acrylate.

Suitable graft monomers are in principle any of the ethylenically unsaturated monomers having polar groups, or other graftable monomers having polar groups, where these modify the polarity of the essentially non-polar graft base, e.g. ethylenically unsaturated carboxylic acids, such as (meth)acrylic acid and derivatives thereof, such as esters, nitriles, or amides, if appropriate in combination with comonomers, such as acrylonitrile, or styrene combined with acrylonitrile.

Particular preference is given to a graft copolymer based on polyethylene or polypropylene grafted with acrylonitrile or with styrene/acrylonitile. Products of this type are known and are commercially available, an example being the product Modiper A 1401 from NOF Corporation, Tokyo, Japan.

Preferred graft bases for the graft copolymers of the second type are polybutadiene, polyisoprene, and/or polybutadiene/styrene. Suitable graft monomers are In principle any of the ethylenically unsaturated monomers. These are preferably ethylenically unsaturated monomers having polar groups, as described at an earlier stage above for the production of (A4) of the first type.

Particular preference is given to graft copolymers based on polybutadiene and on a two-shell graft envelope composed of polystyrene and polymethacrylate. Products of this type are known and are available commercially. An example of these is the product Paraloid EXL 2600 from Rohm and Haas Deutschland GmbH, Frankfurt am Main.

(A5) from 0.1-50.0%, preferably from 1.0% to 25.0%, of an ultrahigh-molecular-weight polyethylene powder whose molar mass is >$10^6$ g/mol. Products of this type are known and are available commercially. An example of these is the product GUR 4120 from Ticona GmbH, Kelsterbach, Germany.
(A6) from 0.1% -100%, preferably from 0.1-5.0% by weight, particularly preferably from 0.5-3% by weight, of stearyl stearate (e.g. Unister M9676, produced by NOF, Japan)
(A7) from 0.1% -10% by weight, preferably from 0.5-5.0% by weight, particularly preferably from 0.8-2.0% by weight, of a silicone oil, in order to suppress migration of silicone oil out of the moldings, it is advantageous to use a silicone oil whose molar mass is >20 000 g/mol.

In principle, it is possible to use any of the polysiloxanes that are liquid at room temperature, as long as their molar mass is at least 20 000 g/mot, preferably from 25 000 to 300 000 g/mot. Typical viscosities of these silicone oils at 25° C. are in the region of from 500 to 300 000 mm$^2$/s. They are particularly preferably dialkylpolysiloxanes, in particular dimethylpolysiloxanes. Products of this type are commercially available by way of example as AK silicone oils (produced by Wacker Chemie GmbH, Germany) (e.g. the silicone oil 200 Fluid 30000 CS).

(A8) from 0.1%-5.0% by weight, preferably from 0.5% to 3.0% by weight, of an oxidized polyethylene wax (e.g. Licowachs PED 191, produced by Clariant GmbH, Germany)

(A9) from 0.1%-5.0% by weight, preferably from 0.2-2.0% by weight, of an amide wax (erg. Licowachs C, produced by Clariant GmbH, Germany)

(A10) from 0.1%-5.0% by weight, preferably from 0.5-3.0% by weight, of an aliphatic ester wax composed of a fatty acid and of a monohydric alcohol (e.g. Loxiol P1206, produced by Cognis, Germany)

(A11) from 0.1% to 5.0% by weight, preferably from 0.5-3.0% by weight, of a polyethylene wax (e.g. PE 520, Clariant, Germany)

Polyoxymethylene molding compositions provided with the stabilizer systems described here are preferably those which comprise oxidizable or partially oxidized tribological modifiers. Examples of these modifiers are PTFE (A1), molybdenum sulfide (A2), graft copolymers (A4), ultrahigh-molecular-weight polyethylene powder (A5), stearyl stearate (A6), or oxidizable waxes of (A9), (A10) or (A11).

The inventive molding composition or the moldings produced therefrom comprise from 0.01-0.5%, preferably from 0.03-0.3%, of a cyclic stabilizer (B) which contains at least one nitrogen atom, preferably one or two nitrogen atoms, in the ring. Suitable stabilizers are heterocyclic compounds having at least one nitrogen atom as heteroatom, either adjacent to an amino-substituted carbon atom or to a carbonyl group, examples being pyridazine, pyrimidine, pyrazine, pyrrolidone, aminopyridine, and compounds derived therefrom. Advantageous compounds of this generic type are aminopyridine and its derivatives. In principle, any of the aminopyridines is suitable, examples being melamine, 2,6-diaminopyridine, substituted and dimeric aminopyridines, and mixtures produced from these compounds. Other advantageous compounds are polyamides and dicyandiamide, urea and its derivatives, and also pyrrolidone and compounds derived therefrom. Examples of suitable pyrrolidones are imidazolidinone and compounds derived therefrom, an example being hydantoin, the derivatives of which are particularly advantageous, and among these compounds allantoin and its derivatives are particularly advantageous. Other particularly advantageous compounds are triamino-1,3,5-triazine (melamine) and its derivatives, examples being melamine-formaldehyde condensates and methylolmelamine. Very particular preference is given to melamine, methylolmelamine, melamine formaldehyde condensates, and allantoin. The nitrogen-containing stabilizers can be used individually or in combination.

As component (C), preference is given to from 0.05-1% by weight, preferably from 0.1-0.5% by weight, of an ester composed of a polyhydric alcohol and of at least one ($C_{10}$-$C_{32}$) fatty acid (C), esters composed of higher fatty acids having from 24-32 carbon atoms and of polyhydric alcohols having from 2-8 carbon atoms, more preferably from 2-5 carbon atoms. It is not necessary that the acids have been completely esterified, and they may also be only partially esterified, or the esters may have been partially saponified. Particularly preferred polyhydric alcohols are glycerol, pentaerythritol, or glycols, in particular alkylene glycols or dialkylene glycols, e.g. ethylene glycol, diethylene glycol or butylene glycol. Among the fatty acids, montanic acids are particularly preferred. Very particularly preferred esters are diesters composed of glycol or glycerol and montanic acids (e.g. Licowachs E and Licotub WE4, produced by Clariant AG).

The other constituents, components (D) to (H) of the inventive molding compositions and, respectively, moldings are optional and do not necessarily have to be present in order to achieve the property profile demanded. However, each of these components improves at least one of the following properties: very low emission, colorfastness, and long-term mechanical properties.

As component (D), up to 0.5% by weight, preferably from 0.001-0.2%, particularly preferably from 0.01 to 0.1%, of a metal salt of a fatty acid (D) is present in the inventive molding composition. It is possible to use alkali metal salts and alkaline earth metal salts or salts of other divalent metal ions, e.g. $Zn^{2+}$, of long-chain fatty acids having from 10 to 32 carbon atoms, examples being stearates, laurates, oleates, behenates, montanates, palmitates. The fatty acids may be unsaturated or saturated and can also have hydroxy or amino groups as substituents. Preference is given to the alkaline earth metal and zinc salts of stearic acid and of the montanic acids.

As components (E), from 0.0-1.0% by weight, preferably from 0.01-0.05% by weight, particularly from 0.05-0.2% by weight, of a metal salt of a short-chain carboxylic acid (E) can be present. Any of the mono- and divalent metal ions can be used, but preference is given to alkali metals and alkaline earth metals. The short-chain carboxylic acids have from 3-8 carbon atoms. Preference is given to propionates, citrates, and pyruvates. Calcium citrate is particularly preferred.

The molding composition can comprise from 0.0 to 1.0% by weight, preferably from 0.0 to 0.4%, particularly preferably from 0.0-0.1%, of a sterically hindered phenol compound (F). Examples of commercially available compounds of this type are pentaerythritol tetrakis[3-(3,5-di-tert-butyl-4-hydroxyphenyl)propionate] (Irganox 1010, Ciba Geigy, Switzerland), triethylene glycol bis[3-(3-tert-butyl-4-hydroxy-5-methylphenyl)propionate] (Irganox 246, Ciba Geigy, Switzerland), 3,3'-bis[3-(3,5-di-tert-butyl-4-hydroxyphenyl)propionohydrazide] (Irganox MD 1024, Ciba Geigy, Switzerland), hexamethyleneglycol bis(3-3,5-di-tert-butyl-4-hydroxy-phenyl)propionate] (Irganox 259, Ciba Geigy, Switzerland), 3,5-di-tert-butyl-4-hydroxytoluene (Lowinox BHT, Great Lakes). Preference is given to Irganox 1010 and especially to Irganox 245.

The molding composition can also comprise from 0.0-1.0% by weight, preferably from 0.01-0.9% by weight, particularly preferably from 0.02-0.8% by weight, of at least one stabilizer from the group of the benzotriazole derivatives or benzophenone derivatives or aromatic benzoate derivatives (G). Preference is given to 2-[2'-hydroxy-3',5'-bis(1,1-dimethylbenzyl)phenyl]benzotriazole, which is commercially available as Tinuvin 234 (Ciba Geigy, Switzerland).

As components (H), from 0.0-0.5% by weight, preferably from 0.01-0.4% by weight, very particularly preferably 0.4% by weight, of a sterically hindered amine can be present as light stabilizer (HALS) system (H) in the inventive molding composition. Preference is given to 2,2,6,6-tetramethyl-4-piperidyl compounds, e.g. bis(2,2,6,6-tetramethyl-piperidyl) sebacate (Tinuvin 770, Ciba Geigy, Switzerland), or the polymer composed of dimethyl succinate and 1-(2-hydroxyethyl)-4-hydroxy-2,2,6,6-tetramethyl-4-piperidine (Tinuvin 622, Ciba Geigy, Switzerland).

The polyoxymethylene polymers (I) used as parent material for the colored molding compositions can be polyoxymethylene homo- or copolymers. Polymers of this type are known to the person skilled in the art and are described in the literature. The homopolymers are usually produced via polymerization of formaldehyde or trioxane, and this polymerization can be initiated cationically or anionically. However, preference is given to polyoxymethylene copolymers which contain not only oxymethylene units but also oxyalkylene units, and the alkylene groups here can contain from 2 to 8 carbon units, in linear or branched form. Particular preference is given to polyoxymethylene polymers which in essence have oxymethylene and oxyethylene units in the polymer chain. The proportion of the oxyethylene units in the structural units of the polymer chain is from 0.1 to 15 mol %, preferably from 0.2 to 10 mol %. The melt index MFI, measured to ISO 1133 at 190° C. with an applied weight of 2.16 kg is from 0.5-75 g/10 min, preferably from 260 g/10 min, and particularly preferably from 5-35 g/10 min. The number-average molar mass is at least 5000 g/mol and at most 100 000 g/mol. determined via GPC in dimethylacetamide at from 150 to 160° C. It is also possible to use a mixture of various, differently constituted polyoxymethylene copolymers, instead of a single POM copolymer. The POM copolymers can be produced by well-known production processes. An example of a possible process is copolymerization of trioxane with dioxolane in the presence of widely used conventional amounts of $BF_3$ and methylal.

The inventive molding composition can comprise up to 40% by weight of other conventional additives individually or in the form of a mixture, examples being nucleating agents, such as polyoxymethylene terpolymers, or talc, fillers, such as glass beads, wollastonite, loam, or graphite, inorganic or organic fibers, such as glass fibers, carbon fibers, or aramid fibers, and thermoplastic or thermoset plastics additives or elastomers, such as polyethylene, polyurethane, polymethyl methacrylate, polybutadiene, polystyrene, One particularly preferred embodiment of the invention is provided by polyoxymethylene molding compositions comprising tribological modifiers and comprising, as stabilizer system, alongside a component (B), at least two synergistic components (C).

Component (C) here is a mixture composed of (C1) x % by weight of an unsaponified ester composed of a polyhydric alcohol and of at least one ($C_{10}$-$C_{32}$) fatty acid, and (C2) y % by weight of a partially saponified ester composed of a polyhydric alcohol and of at least one ($C_{10}$-$C_{32}$) fatty acid, where x is greater than 0.01% by weight, y is smaller than 0.99% by weight and the total of x and y is smaller than 1.0% by weight and it is particularly preferable here that the value of x and y may be, independently of the other, from 0.03% by weight to 0.6% by weight, particularly from 0.5% by weight to 0.2% by weight.

The inventive modified polyoxymethylene molding compositions comprising, as stabilizer, the components (B), (C1) and (C2) mentioned, feature particularly low formaldehyde emission.

As component (C1), unsaponified esters composed of higher fatty acids having from 10-32 carbon atoms, preferably from 24-32 carbon atoms, and of polyhydric alcohols having from 2-8 carbon atoms, preferably from 2-5 carbon atoms, are used. It is not necessary that the polyhydric alcohols have been completely esterified: they can also have been partially esterified. Preferred polyhydric alcohols are glycerol, pentaerythritol, or glycols, in particular alkylene glycols or dialkylene glycols, e.g. ethylene glycol, diethylene glycol, or butylene glycol. Among the fatty acids, montanic acids are preferred. Particularly preferred esters are diesters composed of glycol or glycerol and montanic acids (Licowachs E and Licolub WE4, produced by Clariant AG).

As component (C2), partially saponified esters composed of higher fatty acids having from 10-32 carbon atoms, preferably from 24-32 carbon atoms, and of polyhydric alcohols having from 2-8 carbon atoms, preferably from 2-5 carbon atoms, are used. The partially saponified esters can be produced via reaction of a full ester with a base. It is also possible to use mixtures of partially saponified esters of a partially esterified polyhydric alcohol with a metal salt of the corresponding fatty acids. Here again, preferred polyhydric alcohols are glycerol, pentaerythritol, or glycols, in particular alkylene glycols or dialkylene glycols, e.g. ethylene glycol, diethylene glycol, or butylene glycol. Among the fatty acids, montanic acids are likewise preferred here. Preferred metals are those which occur in the form of mono- or divalent ions, examples being alkali metals and alkaline earth metals. Particular preference is given to a partially saponified ester composed of butylene glycol and montanic acids, where excess montanic acid units have been saponified with calcium hydroxide (e.g. Licowachs OP, produced by Clariant AG).

The present invention also provides the use of the stabilizer systems described for reduction of formaldehyde emission in the production of polyoxymethylene molding compositions comprising tribological modifiers or of polyoxymethylene moldings comprising tribological modifiers, in particular when molding compositions or the moldings are exposed to high temperatures during production or during use.

The inventive tribologically modified POM molding compositions can be produced by the conventional and known mixing processes, such as pelletization, extrusion, kneading, etc. The inventive molding compositions are preferably produced by mixing polyoxymethylene polymer with the tribological modifiers and stabilizers and then pelletizing the mixture.

The inventive tribologically modified POM molding compositions have substantially reduced emission. The reduction in the amount of formaldehyde released can be observed even before production of the molding composition has ended, e.g. during pelletization, and also during processing. The inventive polyoxymethylene composition therefore contributes to workplace health and safety. However, substantial reduction has especially been achieved in the formaldehyde emission of moldings produced via injection molding or extrusion. In an example, formaldehyde emission measured on plaques of wall thickness 1 mm after a storage time of 24 h to VDA 275 is generally less than 30 mg/kg, preferably less than 20 mg/kg.

The mechanical properties of the inventive molding compositions meet the conventional requirements placed upon commercially available polyoxymethylene moldings for tribological applications, and it is therefore possible to utilize, without restriction, the application sectors and processing techniques conventional for POM. The inventive molding compositions are therefore particularly suitable for production of moldings for mechanical elements, e.g. sliding elements.

Particular application sectors for the inventive molding compositions are sliding elements in conveyances, such as automobiles, aircrafts, etc., in household products, in toy items, in baby items, and also in electronic and electrical-engineering components and devices, Examples are provided by guide bushes, slide bushes, gear wheels, mechanisms, conveyor chains, camwheels, cams, zip fasteners, switches, roller guides, sliding guides, rotary latches for automotive locks, windshield-wiper systems, or guides for automotive window lifters. The inventive molding compositions are also suitable for production of apparatuses and instruments, or of parts thereof, for medical applications. The inventively produced molding compositions have the lowest formaldehyde emission when compared with the products currently commercially available, while retaining the typical mechanical properties of polyoxymethylenes.

The present invention is illustrated in further detail below using some inventive examples.

The following methods were used to determine the properties of the materials in the examples below:

Melt index (MVR) to ISO 1133 at 190° C. with an applied weight of 2.16 kg

Tensile modulus of elasticity to ISO 527

Yield stress to ISO 527

Tensile strain at break to ISO 527

Notched impact resistance to ISO 179-1/1eA

Formaldehyde emission: Sheets of wall thickness 1 mm are manufactured from the colored POM molding compositions. After a storage time of 24 h, formaldehyde emission from the sheets was determined to VDA 275 (VDA Empfehlung No. 275, Dokumentation Kraftfahrwesen e.V. July 1994).

Test specimen production: The polyacetal pellets are molded via injection molding to give plaques of dimensions 80*60*1 mm. A Krauss Maffei KM 120/340B injection molding machine is used with the following Injection-molding parameters: melt temperature 195° C., flow front velocity 200 mm/s, mold wall temperature 85° C., hold pressure 900 bar, hold pressure time 30 s, cooling time 10 s, back pressure from 0 to 10 bar. The test specimens are stored for 24 h at 23° C. and 50% relative humidity in a cabinet providing standard conditions, prior to testing.

Testing: Two test specimens are suspended on a stainless steel hook in a 1 l glass flask over 50 ml of deionized water, and placed for 3 h at 60° C. in a drying cabinet with air circulation. The test specimens are removed from the test flask. 5 ml of specimen solution are pipetted into a test tube, which is heat-conditioned at 95° C. for 10 minutes, 3 ml of acetylacetone and 3 ml of a 20% strength ammonium acetate solution are then added to the test tube. With the reagents, formaldehyde forms the diacetyldihydrolutidine complex, whose absorption at 412 nm is determined photometrically. Formaldehyde concentration in the specimen solution is calculated from the absorption value.

In the inventive examples and comparative examples, the polyoxymethylene used was Hostaform C 9021 powder. In the experiments listed in table 1, the polymer comprised 3.4% of dioxolane as comonomer, and $BF_3$ was used as initiator. In comparative experiments, Eurelon from Vantico, Germany and dicyandiamide (DCD) were used to reduce emission.

INVENTIVE EXAMPLE 1

The following components are combined and intensively mixed in a Henschel mixer: 400 g of Irganox 245, 50 g of melamine, 200 g of Licowachs E, 100 g of magnesium stearate, 20 kg of PTFE micropowder (Dyneon TF 9201), the balance of 100 kg being Hostaform C 9021 polyoxy-methylene powder. The mixture is pelletized on a twin-screw extruder.

The components for inventive examples 2 to 22 and comparative examples 1 to 21 were mixed as described above and processed on a twin-screw extruder to give pellets. The mixing specifications for the examples and comparative examples are given in tables 1 and 2.

The pellets of the examples and comparative examples were used to injection-mold the test specimens for determination of tensile modulus of elasticity, of yield stress, and of tensile strain at break, and also to injection-mold the sheets for determination of formaldehyde emission. The results of the mechanical tests and the emission test to VDA 275 from the inventive examples and from the comparative examples are given in tables 3 and 4.

The inventive examples show that formaldehyde emission can be greatly reduced via stabilizer systems composed of melamine, Licowachs E and Mg stearate, respectively, Licowachs OP. The reduction in formaldehyde emission is particularly good using stabilizer systems composed of melamine and of a combination of Licowachs E and Licowachs OP (component (C1) and (C2)). The inventive examples moreover show that the reduction in formaldehyde emission in molding compositions comprising oxidizable tribological modifiers is particularly impressive, and by way of example formaldehyde emission can be lowered by a factor of from 3 to 5 when using oxidizable wax (GUR4120, EWX PE wax), whereas a reduction in emission by only a factor of from 2 to 3 is achieved when using previously oxidized Licowachs PED 191 as tribological modifier.

TABLE 1

Table 1: Mixing specifications

| | Irganox 1010 [%] | Irganox 245 [%] | Licowachs C [%] | Tricalcium citrate [%] | DCD [%] | Licowachs E [%] | Mg stearate [%] | Melamine [%] | Licowachs OP [%] | Eurelon [%] | PTFE powder [%] | $MoS_2$ powder [%] | Modiper A 1401 [%] | Unister M9676 [%] | Ca carbonate SL 101 [%] |
|---|---|---|---|---|---|---|---|---|---|---|---|---|---|---|---|
| Inv. Ex. 1 | — | 0.4 | — | — | — | 0.2 | 0.1 | 0.05 | — | — | 20 | — | — | — | — |
| Inv. Ex. 2 | — | 0.4 | — | 0.1 | — | 0.2 | 0.1 | 0.05 | — | — | 5 | — | — | — | — |
| Inv. Ex. 3 | — | 0.4 | — | 0.1 | — | 0.1 | — | 0.05 | 0.1 | — | 20 | — | — | — | — |
| Comp. 1 | — | 0.4 | 0.2 | 0.1 | 0.02 | — | — | — | — | — | 20 | — | — | — | — |
| Comp. 2 | — | 0.4 | 0.2 | 0.1 | 0.02 | — | — | — | — | 0.05 | 5 | — | — | — | — |
| Inv. Ex. 4 | 0.5 | — | — | — | — | 0.2 | 0.1 | 0.05 | — | — | — | — | 1 | — | — |
| Inv. Ex. 5 | 0.5 | — | — | — | — | 0.1 | — | 0.05 | 0.1 | — | — | — | 1 | — | — |
| Comp. 3 | 0.5 | — | — | — | — | — | 0.1 | — | — | — | — | — | 1 | — | — |
| Comp. 4 | 0.5 | — | — | — | 0.3 | — | — | — | — | — | — | — | 1 | — | — |
| Comp. 5 | 0.5 | — | — | — | 0.3 | — | — | 0.05 | — | 0.05 | — | — | 1 | — | — |
| Inv. Ex. 6 | — | 0.4 | — | 0.1 | — | 0.2 | 0.1 | 0.05 | — | — | — | — | — | 5 | — |
| Inv. Ex. 7 | — | 0.4 | — | 0.1 | — | 0.2 | 0.1 | 0.05 | — | 0.05 | — | — | — | 5 | — |

TABLE 1-continued

Table 1: Mixing specifications

| | Irganox 1010 [%] | Irganox 245 [%] | Lico-wachs C [%] | Tri-calcium citrate [%] | DCD [%] | Lico-wachs E [%] | Mg stearate [%] | Mela-mine [%] | Lico-wachs OP [%] | Eurelon [%] | PTFE powder [%] | MoS$_2$ powder [%] | Modi-per A 1401 [%] | Unister M9676 [%] | Ca carbo-nate SL 101 [%] |
|---|---|---|---|---|---|---|---|---|---|---|---|---|---|---|---|
| Inv. Ex. 8 | — | 0.4 | — | 0.1 | — | 0.1 | — | — | 0.05 | 0.1 | — | — | 5 | — | — |
| Comp. 6 | — | 0.4 | 0.2 | 0.1 | — | — | — | — | — | 0.05 | — | — | 5 | — | — |
| Comp. 7 | — | 0.4 | — | 0.1 | — | 0.2 | — | — | 0.05 | — | — | — | 5 | — | — |
| Inv. Ex. 9 | 0.3 | — | — | 0.1 | — | 0.2 | 0.1 | 0.05 | — | — | — | — | 5 | 2 | 10 |
| Inv. Ex. 10 | 0.3 | — | — | 0.1 | — | 0.1 | — | 0.05 | 0.1 | — | — | — | 5 | 2 | 10 |
| Comp. 8 | 0.3 | — | — | 0.1 | 0.02 | — | — | — | — | — | — | — | 5 | 2 | 10 |
| Comp. 9 | 0.3 | — | — | 0.1 | 0.2 | — | — | — | — | 0.05 | — | — | 5 | 2 | 10 |

TABLE 2

| | Irganox 245 [%] | Lico-wachs C [%] | Tri-calcium citrate [%] | DCD [%] | Lico-wachs E [%] | Mg stearate [%] | Melamine [%] | Lico-wachs OP [%] | Eurelon [%] | Silicone oil 2000 Fluid 30000 [%] | Ca carbonate SL 101 [%] | Lico-wachs PED 191 [%] | GUR 4120 [%] | Loxiol P 1206 [%] | EWX PE wax [%] |
|---|---|---|---|---|---|---|---|---|---|---|---|---|---|---|---|
| Inv. Ex. 11 | 0.4 | — | 0.1 | — | 0.2 | 0.1 | 0.05 | — | — | 2 | — | — | — | — | — |
| Inv. Ex. 12 | 0.4 | — | 0.1 | — | 0.1 | — | 0.05 | 0.1 | — | 2 | — | — | — | — | — |
| Comp. 10 | 0.4 | 0.2 | 0.1 | 0.02 | — | — | — | — | — | 2 | — | — | — | — | — |
| Comp. 11 | 0.4 | 0.2 | 0.1 | 0.02 | — | — | — | — | 0.05 | 2 | — | — | — | — | — |
| Inv. Ex. 13 | 0.4 | — | 0.1 | — | 0.2 | 0.1 | 0.05 | — | — | — | 5 | — | — | — | — |
| Inv. Ex. 14 | 0.4 | — | 0.1 | — | 0.1 | — | 0.05 | 0.1 | — | — | 5 | — | — | — | — |
| Comp. 12 | 0.4 | 0.2 | 0.1 | 0.02 | — | — | — | — | — | — | 5 | — | — | — | — |
| Comp. 13 | 0.4 | 0.2 | 0.1 | 0.02 | — | — | — | — | 0.05 | — | 5 | — | — | — | — |
| Inv. Ex. 15 | 0.3 | — | — | — | 0.2 | 0.1 | 0.05 | — | — | — | — | 1 | — | — | — |
| Inv. Ex. 16 | 0.3 | — | — | — | 0.1 | — | 0.05 | 0.1 | — | — | — | 1 | — | — | — |
| Comp. 14 | 0.3 | 0.2 | 0.1 | — | — | — | — | — | 0.05 | — | — | 1 | — | — | — |
| Comp. 15 | 0.3 | 0.2 | 0.1 | 0.02 | — | — | — | — | 0.05 | — | — | 1 | — | — | — |
| Inv. Ex. 17 | 0.2 | 0.7 | 0.05 | — | 0.2 | 0.1 | 0.05 | — | — | — | — | — | — | — | — |
| Inv. Ex. 18 | 0.2 | 0.7 | 0.05 | — | 0.1 | — | 0.05 | 0.1 | — | — | — | — | — | — | — |
| Comp. 16 | 0.2 | 0.7 | 0.05 | — | — | — | — | — | 0.05 | — | — | — | — | — | — |
| Comp. 17 | 0.2 | 0.7 | 0.05 | 0.02 | — | — | — | — | 0.05 | — | — | — | — | — | — |
| Inv. Ex. 19 | 0.4 | — | 0.1 | — | 0.2 | 0.1 | 0.05 | — | — | — | — | — | 10 | — | — |
| Inv. Ex. 20 | 0.4 | — | 0.1 | — | 0.1 | — | 0.05 | 0.1 | — | — | — | — | 10 | — | — |
| Comp. 18 | 0.4 | 0.2 | 0.1 | 0.02 | — | — | — | — | — | — | — | — | 10 | — | — |
| Comp. 19 | 0.4 | 0.2 | 0.1 | 0.02 | — | — | — | — | 0.05 | — | — | — | 10 | — | — |
| Inv. Ex. 21 | 0.3 | — | 0.1 | — | 0.2 | 0.1 | 0.05 | — | — | — | — | — | — | 1 | 1 |
| Inv. Ex. 22 | 0.3 | — | 0.1 | — | 0.1 | — | 0.05 | 0.1 | — | — | — | — | — | 1 | 1 |
| Comp. 20 | 0.3 | 0.2 | 0.1 | — | — | — | — | — | 0.05 | — | — | — | — | 1 | 1 |
| Comp. 21 | 0.3 | 0.2 | 0.1 | 0.02 | — | — | — | — | 0.05 | — | — | — | — | 1 | 1 |

TABLE 3

Table 3: Properties of injection-molded tensile specimens and sheets

| | MVR [ml/10 min] | Tensile modulus of elasticity [N/mm$^2$] | Yield stress [N/mm$^2$] | Tensile stress at break [%] | Notched impact resistance [kJ/mm$^2$] | VDA 275 [mg/kg] |
|---|---|---|---|---|---|---|
| Inv. Ex. 1 | 6.0 | 2500 | 50 | 16 | 4.1 | 21.3 |
| Inv. Ex. 2 | 7.2 | 2600 | 58 | 28 | 6.0 | 15.7 |
| Inv. Ex. 3 | 5.9 | 2515 | 51 | 15 | 5.5 | 9.9 |
| Comp. Ex. 1 | 6.2 | 2495 | 49 | 18 | 4.7 | 191 |
| Comp. Ex. 2 | 7.5 | 2605 | 58 | 30 | 5.1 | 179 |
| Inv. Ex. 4 | 8.5 | 2800 | 65 | 20 | 6.3 | 15.3 |
| Inv. Ex. 5 | 8.3 | 2820 | 68 | 20 | 6.1 | 10.9 |
| Comp. Ex. 3 | 8.5 | 2795 | 65 | 22 | 6.4 | 146 |
| Comp. Ex. 4 | 8.6 | 2793 | 64 | 18 | 5.9 | 297 |
| Comp. Ex. 5 | 8.7 | 2809 | 66 | 19 | 6.0 | 263 |
| Inv. Ex. 6 | 8.0 | 2600 | 58 | 20 | 6.1 | 6.5 |
| Inv. Ex. 7 | 8.0 | 2624 | 60 | 21 | 5.6 | 9.3 |
| Inv. Ex. 8 | 8.1 | 2604 | 59 | 18 | 6.2 | 6.0 |
| Comp. Ex. 6 | 7.8 | 2590 | 58 | 20 | 6.1 | 173 |
| Comp. Ex. 7 | 8.1 | 2597 | 59 | 21 | 7.1 | 15.9 |
| Inv. Ex. 9 | 6.8 | 2850 | 53 | 16 | 4.2 | 17.5 |
| Inv. Ex. 10 | 7.0 | 2873 | 54 | 16 | 4.1 | 13.8 |
| Comp. Ex. 8 | 7.1 | 2846 | 52 | 14 | 4.0 | 65.6 |
| Comp. Ex. 9 | 6.9 | 2839 | 53 | 17 | 5.1 | 49.8 |

TABLE 4

Table 4: Properties of injection-molded tensile specimens and sheets

| | MVR [ml/10 min] | Tensile modulus of elasticity [N/mm$^2$] | Yield stress [N/mm$^2$] | Tensile stress at break [%] | Notched impact resistance [kJ/mm$^2$] | VDA 275 [mg/kg] |
|---|---|---|---|---|---|---|
| Inv. Ex. 11 | 8.2 | 2600 | 51 | 30 | 5.3 | 12.5 |
| Inv. Ex. 12 | 8.0 | 2607 | 52 | 25 | 6.0 | 10.0 |
| Comp. Ex. 10 | 8.5 | 2590 | 50 | 33 | 5.5 | 34.5 |
| Comp. Ex. 11 | 8.6 | 2599 | 50 | 31 | 4.9 | 29.3 |
| Inv. Ex. 13 | 7.5 | 3000 | 60 | 22 | 5.2 | 15.0 |
| Inv. Ex. 14 | 7.8 | 2930 | 59 | 25 | 5.0 | 12.8 |
| Comp. Ex. 12 | 7.3 | 3051 | 61 | 20 | 5.4 | 43.7 |
| Comp. Ex. 13 | 7.5 | 3010 | 61 | 21 | 4.8 | 40.4 |
| Inv. Ex. 15 | 8.6 | 2700 | 62 | 30 | 7.0 | 9.3 |
| Inv. Ex. 16 | 9.1 | 2721 | 64 | 28 | 7.2 | 6.5 |
| Comp. Ex. 14 | 8.9 | 2690 | 62 | 32 | 6.8 | 18.7 |
| Comp. Ex. 15 | 9.0 | 2700 | 63 | 31 | 7.1 | 15.6 |
| Inv. Ex. 17 | 8.2 | 2800 | 64 | 25 | 6.5 | 8.4 |
| Inv. Ex. 18 | 8.0 | 2730 | 65 | 22 | 6.8 | 4.9 |
| Comp. Ex. 16 | 7.9 | 2764 | 64 | 24 | 5.9 | 15.3 |
| Comp. Ex. 17 | 7.8 | 2810 | 65 | 23 | 6.3 | 12.6 |
| Inv. Ex. 19 | 5.5 | 2300 | 45 | 10 | 3.5 | 12.6 |
| Inv. Ex. 20 | 5.3 | 2390 | 43 | 8 | 3.7 | 9.7 |
| Comp. Ex. 18 | 5.6 | 2350 | 44 | 12 | 3.8 | 41.5 |
| Comp. Ex. 19 | 5.5 | 2290 | 41 | 11 | 3.5 | 36.9 |
| Inv. Ex. 21 | 11.8 | 2700 | 61 | 28 | 7.0 | 25.7 |
| Inv. Ex. 22 | 13.0 | 2650 | 60 | 30 | 6.8 | 31.8 |
| Comp. Ex. 20 | 9.9 | 2630 | 61 | 28 | 6.5 | 117.8 |
| Comp. Ex. 21 | 10.3 | 2670 | 59 | 31 | 6.6 | 95.2 |

The invention claimed is:

1. A molding or molding composition composed of polyoxymethylene, comprising (A) from 0.1 to 50% by weight of a tribological modifier selected from the group consisting of polytetrafluoroethylenes, molybdenum sulfides, calcium carbonates, graft copolymers containing an olefin polymer graft base and at least one polymer grafted to the graft base selected from polyvinyls and polyesters, graft copolymers containing an elastomeric polydiene-based core and a hard graft envelope comprising a (meth)acrylate and/or (meth)acrylonitrile, ultrahigh-molecular-weight polyethylene powders, stearyl stearates, ester waxes composed of a fatty acid and of a monohydric alcohol, polyethylene waxes, amide waxes; and mixtures thereof, (B) from 0.01-0.5% by weight of a cyclic stabilizer which contains at least one nitrogen atom in the ring, and (C) from 0.05 to 1% by weight of at least one ester composed of a polyhydric alcohol and of at least one ($C_{24}$-$C_{32}$) fatty acid;

wherein the molding or a molding produced from the molding composition comprises a formaldehyde emission of less than 30 mg/kg, measured according to VDA 275 testing standard.

2. The molding or molding composition as claimed in claim 1, which further comprises up to 0.5% by weight of a metal salt of a ($C_{10}$-$C_{32}$) fatty acid (component D).

3. The molding or molding composition as claimed in claim 1, wherein component (C) is a mixture comprising (C1) x % by weight of an unsaponified ether composed of a polyhydric alcohol and of at least one ($C_{24}$-$C_{32}$) fatty acid, and (C2) y % by weight of a partially saponified ester composed of a polyhydric alcohol and of at least one ($C_{24}$-$C_{32}$) fatty acid, where x is greater than 0.01% by weight, y is smaller than 0.99% by weight and the total of x and y is smaller than 1.0% by weight.

4. The molding or molding composition as claimed in claim 3, wherein the value of x and y, independently of the other, is from 0.03% by weight to 0.5% by weight.

5. The molding or molding composition as claimed in claim 1, which comprises up to 1.0% by weight of an antioxidant.

6. The molding or molding composition as claimed in claim 1, which comprises from 0 to 1% by weight of a metal salt of a ($C_1$-$C_9$) carboxylic acid, from 0 to 1.0% by weight of at least one other stabilizer from the group of the benzotriazole derivatives or benzophenone derivatives or aromatic benzoate derivatives, and from 0 to 0.5% by weight of a sterically hindered amine (HALS).

7. A process for production of molding compositions and of molding composed of polyoxymethylene, where a tribological modifier selected from the group consisting of polytetrafluoroethylenes, molybdenum sulfides, calcium carbonates, graft copolymers containing an olefin polymer graft base and at least one polymer grafted to the graft base selected from polyvinyls and polyesters, graft copolymers containing an elastomeric polydiene-based core and a hard graft envelope comprising a (meth)acrylate and/or (meth)acrylonitrile, ultrahigh-molecular-weight polyethylene powders, stearyl stearates, ester waxes composed of a fatty acid and of a monohydric alcohol, polyethylene waxes, amide waxes; and mixtures thereof, and a stabilizer system comprising from 0.01-0.5% by weight of a cyclic stabilizer which contains at least one nitrogen atom in the ring, and from 0.05 to 1% by weight of at least one ester compound of a polyhydric alcohol and of at least one ($C_{24}$-$C_{32}$) fatty acid is admixed with the polyoxymethylene;

wherein the molding or a molding produced from the molding composition comprises a formaldehyde emission of less than 30 mg/kg, measured according to VDA 275 testing standard.

8. A process for reduction of formaldehyde emission from polyoxymethylene molding compositions or from polyoxymethylene moldings, comprising treating the polyoxymethylene molding compositions or the polyoxymethylene moldings with a tribological modifier selected from the group consisting of polytetrafluoroethylenes, molybdenum sulfides, calcium carbonates, graft copolymers containing an olefin polymer graft base and at least one polymer grafted to the graft base selected from polyvinyls and polyesters, graft copolymers containing an elastomeric polydiene-based core and a hard graft envelope comprising a (meth)acrylate and/or (meth)acrylonitrile, ultrahigh-molecular-weight polyethylene powders, stearyl stearates, ester waxes composed of a fatty acid and of a monohydric alcohol, polyethylene waxes, amide waxes; and mixtures thereof, and a stabilizer system comprising from 0.01-0.5% by weight of a cyclic stabilizer which contains at least one nitrogen atom in the ring, and from 0.05 to 1% by weight of at least one ester compound of a polyhydric alcohol and of at least one ($C_{24}$-$C_{32}$) fatty acid is admixed with the polyoxymethylene;

wherein the molding or a molding produced from the molding composition comprises a formaldehyde emission of less than 30 mg/kg, measured according to VDA 275 testing standard.

9. The process as claimed in claim 8, wherein the molding or the molding produced from the molding composition has a formaldehyde emission of less than 20 mg/kg, measured according to VDA 275 testing standard.

10. The molding or molding composition as claimed in claim 1, wherein the molding or a molding produced from the molding composition comprises a formaldehyde emission of less than 20 mg/kg, measured according to VDA 275 testing standard.

11. The process as claimed in claim 7, wherein the molding or a molding produced from the molding composition comprises a formaldehyde emission of less than 20 mg/kg, measured according to VDA 275 testing standard.

* * * * *